US009467065B2

United States Patent
Levilly et al.

(10) Patent No.: US 9,467,065 B2
(45) Date of Patent: Oct. 11, 2016

(54) METHOD AND APPARATUS FOR CONTROLLING A MULTILEVEL SOFT SWITCHING POWER CONVERTER

(71) Applicant: General Electric Company, Schenectady, NY (US)

(72) Inventors: Nicolas Levilly, Yvelines (FR); Philippe Ernest, Yvelines (FR); Julien Bouhraoua, Yvelines (FR); Janusz Rodziewicz, Massy (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/586,162

(22) Filed: Dec. 30, 2014

(65) Prior Publication Data
US 2016/0190956 A1 Jun. 30, 2016

(51) Int. Cl.
*H02M 7/537* (2006.01)
*H02M 7/483* (2007.01)
*H02M 1/00* (2006.01)
*H02M 7/487* (2007.01)

(52) U.S. Cl.
CPC ............. *H02M 7/537* (2013.01); *H02M 7/483* (2013.01); *H02M 7/487* (2013.01); *H02M 2001/0058* (2013.01)

(58) Field of Classification Search
CPC .................... H02M 2001/0058; H02M 7/537; H02M 7/483; H02M 7/487
See application file for complete search history.

(56) References Cited

U.S. PATENT DOCUMENTS

| 6,140,873 | A | 10/2000 | Van Groningen | |
|---|---|---|---|---|
| 6,353,547 | B1 * | 3/2002 | Jang | H02M 7/487 363/132 |
| 2005/0127853 | A1 * | 6/2005 | Su | H02M 7/487 318/108 |
| 2007/0268726 | A1 * | 11/2007 | Kojori | H02J 1/10 363/65 |
| 2013/0235626 | A1 | 9/2013 | Jang et al. | |
| 2014/0043010 | A1 * | 2/2014 | Salem | H02M 3/1584 323/311 |
| 2014/0184189 | A1 * | 7/2014 | Salem | H02M 3/07 323/299 |
| 2014/0232364 | A1 * | 8/2014 | Thomas | H02M 7/483 323/271 |
| 2014/0293667 | A1 * | 10/2014 | Schroeder | H02M 7/483 363/60 |

FOREIGN PATENT DOCUMENTS

WO          02097960 A1     12/2002

OTHER PUBLICATIONS

International Search Report and Written Opinion for PCT/US2015/061623, mail date Mar. 15, 2016, 14 pages.
Song et al., "A Multilevel Soft-Switching Inverter with Inductor Coupling," IEEE, vol. 4, Oct. 8, 2000, 8 pages.
Song et al., "A Soft-Switching High-Voltage Active Power Filter with Flying Capacitors for Urban Maglev System Applications," IEEE, Sep. 30, 2001, 8 pages.

* cited by examiner

*Primary Examiner* — Jue Zhang
*Assistant Examiner* — Lakaisha Jackson
(74) *Attorney, Agent, or Firm* — Boyle Fredrickson, S.C.

(57) ABSTRACT

A system for controlling a multilevel soft switching power converter including a DC bus, a pair of switching arms, and a controller is disclosed. The DC bus has a positive rail and a negative rail operable to have a voltage potential present across the DC bus. Each switching arm is connected between the positive rail and the negative rail and includes four soft switches. Each soft switch is connected between the positive rail, the negative rail, or one of three intermediate connections between the positive and negative rails. Each soft switch is also controlled by a gating signal. A flying capacitor is connected between the first intermediate connection and the third intermediate connection and an output terminal is connected at the second intermediate connection of each switching arm. A controller is operable to generate each of the gating signals utilizing at least three control routines.

17 Claims, 9 Drawing Sheets

|  | State 1 | State 2 | State 3 | State 4 | State 1 | State 2 | State 3 | State 4 |
|---|---|---|---|---|---|---|---|---|
| S1 | -- On -- | Off | Off | Off | -- On -- | Off | Off | Off |
| S2 | -- On -- | Off | Off | Off | -- On -- | Off | Off | Off |
| S3 | Off | Off | -- On -- | Off | Off | Off | -- On -- | Off |
| S4 | Off | Off | -- On -- | Off | Off | Off | -- On -- | Off |
| S5 | Off | Off | -- On -- | Off | Off | Off | -- On -- | Off |
| S6 | Off | Off | Off | Off | -- On -- | Off | Off | Off |
| S7 | -- On -- | Off | Off | Off | -- On -- | Off | Off | Off |
| S8 | -- On -- | Off | Off | Off | -- On -- | Off | Off | Off |

|    | State 1 | State 2 | State 3 | State 4 | State 5 | State 6 | State 7 | State 8 |
|----|---------|---------|---------|---------|---------|---------|---------|---------|
| S1 | Off     | Off     | Off     | Off     | -- On --| Off     | Off     | Off     |
| S2 | -- On --| Off     | Off     | Off     | -- On --| -- On --| -- On --| -- On --|
| S3 | Off     | Off     | -- On --| Off     | Off     | Off     | Off     | Off     |
| S4 | -- On --| -- On --| -- On --| -- On --| Off     | Off     | -- On --| -- On --|
| S5 | Off     | Off     | Off     | -- On --| Off     | -- On --| -- On --| Off     |
| S6 | Off     | Off     | -- On --| Off     | -- On --| Off     | Off     | Off     |
| S7 | -- On --| Off     | Off     | -- On --| Off     | Off     | Off     | Off     |
| S8 | -- On --| -- On --| -- On --| -- On --| -- On --| Off     | Off     | Off     |

|  | State 1 | State 2 | State 3 | State 4 | State 5 | State 6 | State 7 | State 8 |
|---|---|---|---|---|---|---|---|---|
| S1 | Off | Off | Off | Off | -- On -- | Off | Off | Off |
| S2 | -- On -- | Off | Off | Off | Off | Off | Off | Off |
| S3 | Off | Off | -- On -- | -- On -- | -- On -- | Off | -- On -- | Off |
| S4 | -- On -- | Off | -- On -- | Off | Off | Off | -- On -- | -- On -- |

METHOD AND APPARATUS FOR CONTROLLING A MULTILEVEL SOFT SWITCHING POWER CONVERTER

BACKGROUND OF THE INVENTION

The subject matter disclosed herein relates to a system for controlling a multilevel flying capacitor soft switching resonant power converter and optionally also to a system utilizing multiple modulation strategies to provide improved performance of the power converter over a broad range of operating conditions.

As is known to those skilled in the art power converters allow for a controlled output voltage and/or current to be supplied from an input power source. The input power source is a Direct Current (DC) supply which may have a fixed or variable amplitude. The controlled output voltage is an AC voltage and may have a variable amplitude and frequency (AC voltage). Numerous configurations of one or more active or passive switching devices along with inductive or capacitive devices are arranged to provide the controlled output voltage.

A common method for controlling the power converter utilizes "hard" switching. Hard switching requires turning an actively controlled switching device on or off at a desired time without consideration of the current or voltage being conducted by the switch. As a result, spikes in voltage and/or current result during the transitions between on and off. These spikes generate wide band electromagnetic noise as a function of the switching frequency. In addition, the switching devices incur switching losses due to the voltages and/or currents present during reverse recovery of the switching device.

Recent developments in power converters attempt to mitigate the switching losses and noise generated from "hard" switching by implementing "soft" switching. In soft switching, the switching devices are controlled to turn on and off when either the current or the voltage across the switching device is at or near zero. In super resonant inverter topology, the switching device is typically turned off when zero voltage, but some current, is present. A snubber capacitor is connected in parallel across each switching device which quickly removes the remaining current across the switching device after it has been turned off. As a result, a soft switching converter reduces the switching losses and noise generated when compared to a hard switching converter.

As is known, performance of resonant power converters may typically be optimized at one operating point. However, performance diminishes over a wide range of input voltages, load variations, or a combination thereof.

Thus, it would be desirable to provide a resonant converter exhibiting desired performance over a wide range of operating conditions.

BRIEF DESCRIPTION OF THE INVENTION

The subject matter disclosed herein describes an improved system and method of controlling a multilevel, soft switching converter. The multilevel converter is configured to provide five different voltage levels to a load. Snubber capacitors are provided across each of the switches to provide soft switching operation. The multilevel, soft switching converter is configured to be operated across a wide range of loading conditions. Consequently, the multilevel, soft switching converter includes three different operating modes. Each operating mode is optimized to provide an output voltage at a different portion of the overall operating range of the multilevel, soft switching converter. A first operating mode controls operation of the multilevel, soft switching converter up to rated power and, generally, at high power operation. A second operating mode controls operation of the converter over a medium power range of operation, and a third operating mode controls operation of the converter at a low power range of operation.

In one embodiment of the invention, a multilevel soft switching power converter is disclosed which includes a DC bus, a pair of switching arms, and a controller. The DC bus includes a positive rail and a negative rail operable to have a voltage potential present across the DC bus. Each switching arm is connected between the positive rail and the negative rail, and each switching arm further includes four soft switches in series. The first soft switch is connected between the positive rail and a first intermediate connection and is controlled by a first gating signal. The second soft switch is connected between the first intermediate connection and a second intermediate connection and is controlled by a second gating signal. The third soft switch is connected between the second intermediate connection and a third intermediate connection and is controlled by a third gating signal. The fourth soft switch is connected between the third intermediate connection and the negative rail and is controlled by a fourth gating signal. Each switching arm also includes a flying capacitor connected between the first intermediate connection and the third intermediate connection and an output terminal connected at the second intermediate connection. The controller is operable to generate each of the first, second, third, and fourth gating signals utilizing at least three control methods.

According to another embodiment of the invention, a method of controlling a multilevel soft switching power converter is disclosed. The multilevel soft switching power converter includes a pair of switching arms, where each switching arm is connected between a positive rail and a negative rail of a DC bus. Each switching arm comprising four soft switches, connected in series between the positive rail and the negative rail, and a flying capacitor. A command signal corresponding to a desired operation of the multilevel soft switching power converter is received at a controller, where the multilevel soft switching power converter is operable to control the soft switches in at least a first, second, and third operating mode. At least one feedback signal corresponding to a current and/or a voltage present at an input to the power converter is received at the controller. Similarly, at least one feedback signal corresponding to a current and/or a voltage present at an output of the power converter is received at the controller. The controller generates multiple gating signals, where each gating signal corresponds to one of the soft switches. The gating signals are generated in a first sequence in the first operating mode, a second sequence in the second operating mode, and a third sequence in the third operating mode.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Figure 1:
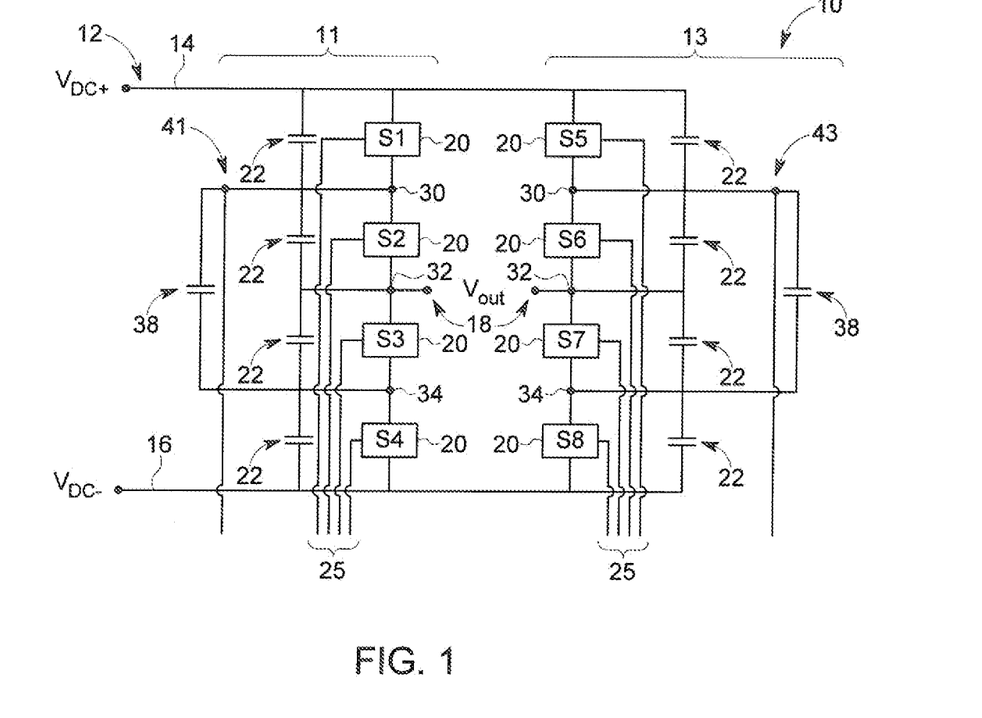
FIG. 1 is a schematic representation of a multilevel soft switching power converter according to one embodiment of the invention.

Turning initially to FIG. 1, one embodiment of the present invention provides a multilevel soft switching power converter 10 with flying capacitors. The power converter 10 receives a Direct Current (DC) voltage, $V_{DC}$, from a DC bus 12 and provides an Alternating Current (AC) voltage, $V_{AC}$, at an output 18. The DC bus 12 includes a positive rail 14 and a negative rail 16. The voltage potential on the positive rail 14 is typically greater than the voltage potential on the negative rail 16. The voltage potential on either the positive rail 14 or the negative rail 16 may be a positive voltage potential with respect to ground, a negative voltage potential with respect to ground, or at a ground potential, that is, zero volts. The power converter 10 includes a first switching arm 11 and a second switching arm 13 where each switching arm 11, 13 is connected between the positive rail 14 and the negative rail 16.

Each switching arm 11, 13 includes four soft switches such that each switching arm 11, 13 may provide one of three voltage potentials ($V_{DC}$, $V_{DC}/2$, and 0) at an output terminal 18 in the switching arm 11, 13. The three voltage potentials applied to each of the switching arms 11, 13 result in five possible voltage potentials applied across the load ($V_{DC}$, $V_{DC}/2$, 0, $-V_{DC}/2$, and $-V_{DC}$) Each soft switch includes a switch module 20 and a snubber capacitor 22 connected in parallel to the switch module 20. A first soft switch is connected between the positive rail 14 and a first intermediate connection 30 between the positive rail 14 and the negative rail 16. A second soft switch is connected between the first intermediate connection 30 and a second intermediate connection 32 between the positive rail 14 and the negative rail 16. A third soft switch is connected between the second intermediate connection 32 and a third intermediate connection 34 between the positive rail 14 and the negative rail 16. A fourth soft switch is connected between the third intermediate connection 34 and the negative rail 16. Each switching arm 11, 13 also includes a flying capacitor 38 connected between the first intermediate connection 30 and the third intermediate connection 34. A first capacitor voltage sensor 41 measures the voltage across the flying capacitor 38 in the first switching arm 11 and a second capacitor voltage sensor 43 measures the voltage across the flying capacitor 38 in the second switching arm 13. The output terminal 18 for each switching arm 11, 13 is connected to the second intermediate connection 32.

Figure 2:
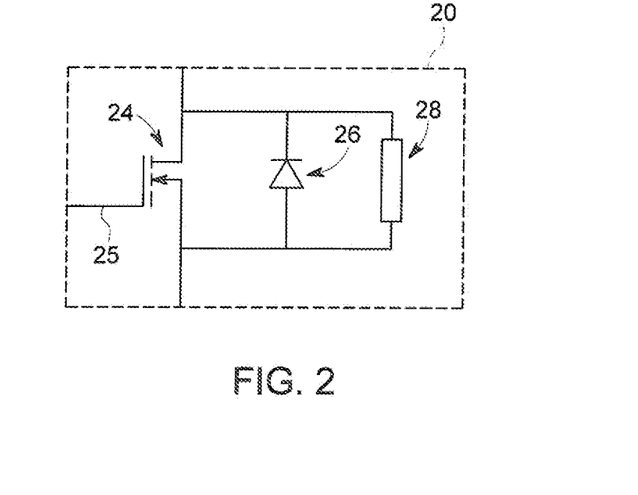
FIG. 2 is a schematic representation of one of the switch modules of FIG. 1.

Referring next to FIG. 2, each switch module 20 includes a solid state switching device 24 and a freewheeling diode 26. According to the illustrated embodiment, the switching device 24 is a MOSFET. The anode of the freewheeling diode 26 is connected to the source of the MOSFET 24 and the cathode of the freewheeling diode 26 is connected to the drain of the MOSFET 24. The gate of the MOSFET receives a gating signal 25. Optionally, the switching device 24 may be any suitable transistor, thyristor, silicon-controlled rectifier, and the like rated to handle the voltage expected across the switching device 24. As illustrated, the switch module 20 may also include a resistance 28 connected in parallel to the freewheeling diode 26. The resistance 28 is preferably a high resistance such that little current is conducted through the resistance 28. Having the resistance 28 connected in parallel in each switch module 20 establishes a voltage divider circuit between the positive rail 14 and the negative rail 16 such that the DC voltage, $V_{DC}$, present on the DC bus 12 is divided evenly across each of the switch modules 20.

Figure 3:
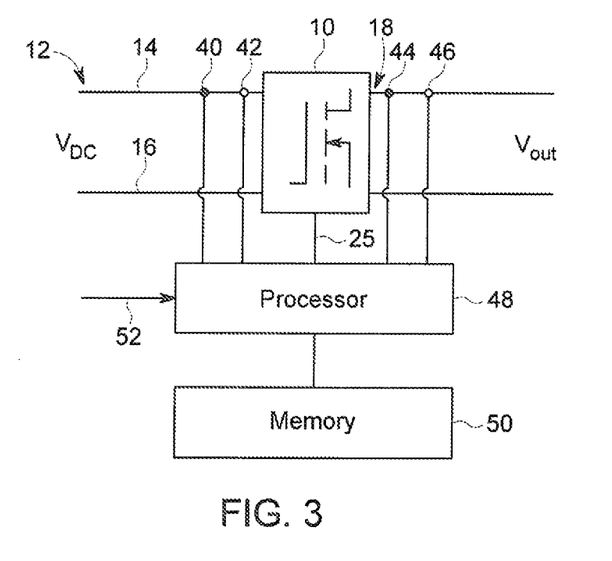
FIG. 3 is a block diagram representation of a controller connected to the power converter of FIG. 1.

Operation of the power converter 10 is controlled by a processor 48. With reference to FIG. 3, the processor 48 is in communication with a memory device 50 which is configured to store instructions, or a program, executable on the processor 48. It is contemplated that the processor 48 may be a general microprocessor or a dedicated controller for the converter. The processor 48 may be a single device or multiple devices configured to operate in parallel. Similarly, the memory device 50 may be a single memory device or multiple memory devices including volatile memory, non-volatile memory, or a combination thereof. It is further contemplated that the processor 48 and the memory device 50 may be implemented on a field programmable gate array (FPGA), application specific integrated circuit (ASIC), or other similar programmable device. The processor 48 and memory device 50 may further be implemented on separate devices or on a single device. A first voltage sensor 40 measures the voltage on the DC bus 12 input to the power converter 10 and a first current sensor 42 measures the current on the DC bus 12. A second voltage sensor 44 measures the voltage output from the power converter 10 and a second current sensor 46 measures the current output from the power converter 10. Feedback signals from each of the sensors 40, 42, 44, 46 are provided to the processor 48. The processor 48 also receives a command signal 52 corresponding to a desired operation of the power converter 10. A control module executing in the processor 48 generates the gating signals 25 to control operation of the switch modules 20 in the power converter 10 to achieve the desired operation responsive to the signals from each of the sensors 40, 42, 44, 46.

In operation, the processor 48 receives the command signal 52 corresponding to a desired operation of the converter 10. The command signal 52 may be, for example, a voltage reference generated by another controller external to the processor 48. Optionally, the command signal 52 may be, for example, a digital input or a communication packet from a network connection providing an indication of a desired operating mode. According to one embodiment of the invention, the converter 10 disclosed herein may be utilized to supply a primary winding of an X-ray generator. The command may be, therefore, a desired voltage output supplied to the primary winding or a desired operating mode, such as low or high power operation. The processor 48 generates the gating signals 25 to provide the commanded operation.

According to the illustrated embodiment, the power converter 10 is controlled to generate five different voltage potential differences across the output terminals 18 to the load ($V_{DC}$, $V_{DC}/2$, 0, $-V_{DC}/2$, and $-V_{DC}$). The processor 48 generates the gating signals 25 to selectively enable and disable the switching devices 24 in each switch arm 11, 13. By enabling different combinations of switching modules 20 the processor 48 controls the output voltage across the output terminals 18. Further, the gating signals 25 are generated such that the voltage potential on each arm 11, 13 is always distributed across at least two of the switch modules 20. Thus, the switch modules 20 and snubber capacitors 22 utilized need only to be rated for one-half the total DC bus voltage expected on the DC bus 12. The gating signals 25 are further generated such that one-half the total DC bus voltage expected on the DC bus 12 is present across the flying capacitor 38 of each switching arm 11, 13. The processor 48 is also configured to generate the gating signals 25 according to three different control methods, one for each operating mode, that satisfy these voltage requirements.

Figure 4:
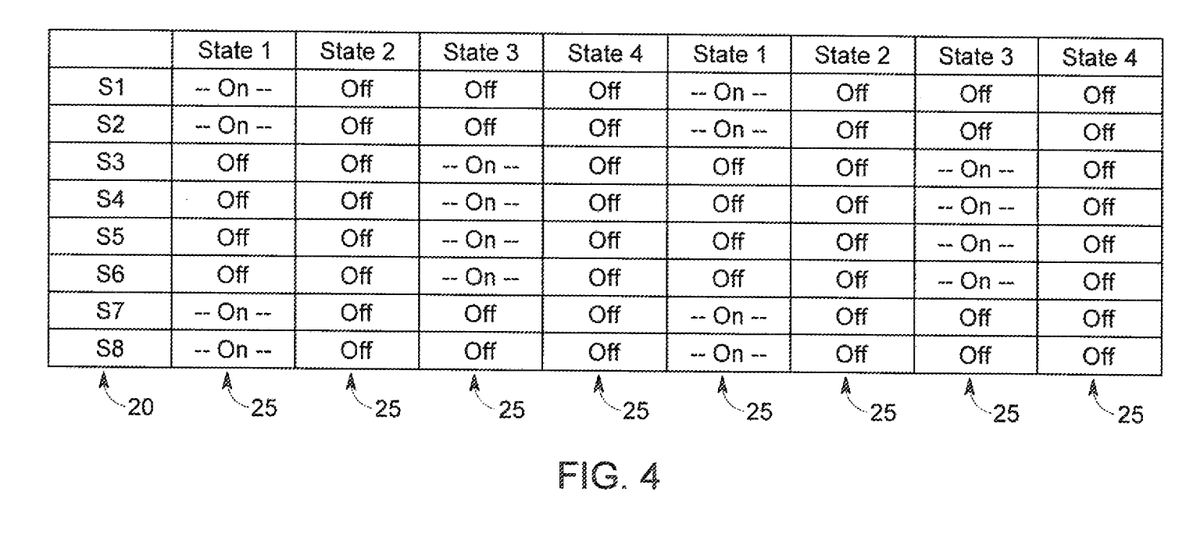
FIG. 4 is a graphical representation of the sequence of gating signals for controlling the power converter of FIG. 1 in a first operating mode.
Figure 5:
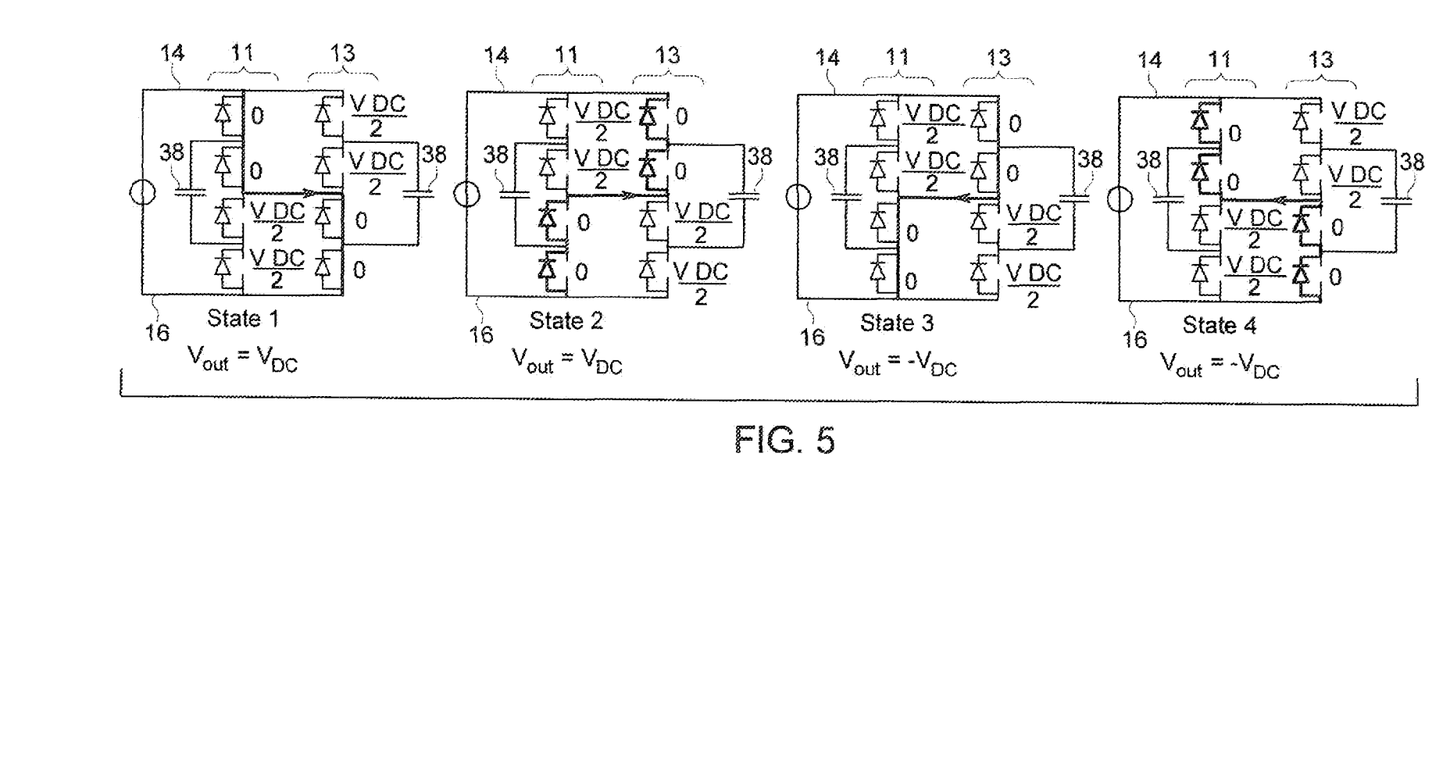
FIG. 5 is a schematic representation of the sequence of operating states for the power converter of FIG. 1 in the first operating mode.

With reference to FIGS. 4 and 5, the processor 48 is operable to execute a first control method. The first control method is configured for a first operating mode which requires high power, where high power may be operation at or above about 25% and, more preferably, above 50% of rated power and up to rated power. The switch modules 20 are controlled to operate in a manner similar to a full bridge inverter. Pairs of the switch modules 20 are controlled together and utilize two levels of the voltage, namely the voltage potentials present on the positive rail 14 and on the negative rail 16 to generate a desired output voltage. The processor 48 generates four sets of gating signals 25, resulting in four states of operation.

In the first operating state for the first operating mode, the processor 48 sets gating signals 25 for, or enables, the first and second switch modules 20 (S1, S2) and the seventh and eight switch modules 20 (S7, S8). The gating signal 25 for switch modules 20 three through six (S3-S6) remains off. As shown in FIG. 5, the current flows from the positive rail 14 of the DC bus through the first and second switch modules S1, S2 of the first switching arm 11 and to the second switching arm 13 via the load across the output voltage terminals 18. The current continues to flow thorough the seventh and eighth switch modules S7, S8 of the second switching arm 13 to the negative rail 16. The voltage potential on each of the switch modules 20 for which the gating signals 25 are set is zero, and the voltage potential on each of the switch modules 20 for which the gating signals 25 are off is one-half the voltage potential present on the DC bus 12. Consequently, the voltage potential on the DC bus 12 is distributed across two of the switch modules 20 in each arm 11, 13 and one-half of the voltage potential on the DC bus 12 is present across the flying capacitor 38 of each switching arm 11, 13.

The power converter 10 remains in the first operating state for a desired conduction time. The conduction time determines, at least in part, the amplitude of the output voltage. In the first mode, the output voltage terminals 18 are connected either to the positive rail 14 or the negative rail 16 via the pairs of switch modules 20. Consequently, the instantaneous value of the output voltage is equal to the voltage potential present on either the positive rail 14 or the negative rail 16. If, for example, the positive rail is 750 VDC and the negative rail 16 is 0 VDC, the output voltage is alternately connected to either the 750 VDC or the 0 VDC. By controlling the relative length of time at which each of the positive rail 14 and the negative rail 16 are connected to the output voltage terminals 18, an average value of voltage between 0 and 750 VDC is seen at the output voltage terminals 18.

The conduction time is determined by a control module executing in the processor 48. The control module receives the feedback signals from one or more of the voltage and/or current sensors 40, 41, 42, 43, 44, 46 as well as the command signal 52. Utilizing, for example, a proportional controller, integral controller, derivative controller, or a combination thereof, the control module determines the conduction time for each gating signal to achieve a desired output voltage. Once the gating signal 25 for the first, second, seventh, and eighth switch modules 20 (S1, S2, S7, S8) has been on for the desired conduction time, the processor 48 turns off the gating signal 25 for each of those switch modules 20 and the gating signals 25 for all of the MOSFETS 24 are off. A resonant current discharges the snubber capacitors 22 for the third, fourth, fifth, and sixth switch modules 20 (S3, S4, S5, S6) and charges the snubber capacitors 22 for the first, second, seventh, and eight switch modules 20 (S1, S2, S7, S8).

Once the snubber charge transfer is complete, the resonant current begins to flow through the freewheeling diodes 26 of the third, fourth, fifth, and sixth switch modules 20 (S3, S4, S5, S6), transitioning to the second operating state. As shown in FIG. 5, the current flows from the negative rail 16 of the DC bus through the freewheeling diodes 26 of the third and fourth switch modules S3, S4 in the first switching arm 11 and to the second switching arm 13 via the load across the output voltage terminals 18. The current continues to flow thorough the freewheeling diodes 26 in the fifth and sixth switch modules S5, S6 in the second switching arm 13 and to the positive rail 14. The voltage potential across the first, second, seventh, and eighth switch modules 20 (S1, S2, S7, S8) is one-half the voltage potential present on the DC bus 12 and the voltage potential across the third, fourth, fifth, and sixth switch modules 20 (S3, S4, S5, S6) is zero. Consequently, the voltage potential on the DC bus 12 is again distributed across two of the switch modules 20 in each arm 11, 13 and one-half of the voltage potential on the DC bus 12 is present across the flying capacitor 38 of each switching arm 11, 13. During the second operating state, the processor 48 sets the gating signals 25 for the third and fourth switch modules 20 (S3, S4) and for the fifth and sixth switch modules 20 (S5, S6), transitioning to the third operating state.

In the third operating state, the gating signal 25 for switch modules 20 one, two, seven, and eight (S1, S2, S7, S8) remains off. As shown in FIG. 5, the current flows from the positive rail 14 of the DC bus through the fifth and sixth switch modules S5, S6 of the second switching arm 13 and to the first switching arm 11 via the load across the output voltage terminals 18. The current continues to flow through the third and fourth switch modules S3, S4 of the first switching arm 11 and to the negative rail 16. The voltage potential on each of the switch modules 20 for which the gating signals 25 are set is zero, and the voltage potential on each of the switch modules 20 for which the gating signals 25 are reset is one-half the voltage potential present on the DC bus 12. Consequently, the voltage potential on the DC bus 12 is distributed across two of the switch modules 20 in each arm 11, 13 and one-half of the voltage potential on the DC bus 12 is present across the flying capacitor 38 of each switching arm 11, 13.

The power converter 10 remains in the third operating state for a desired conduction time. Once the gating signal 25 for the third, fourth, fifth, and sixth switch modules 20 (S3, S4, S5, S6) has been on for the desired conduction time, the processor 48 turns off the gating signal 25 for each of those switch modules 20 and the gating signals 25 for all of the MOSFETS 24 are off. The resonant current discharges the snubber capacitors 22 for the first, second, seventh, and eight switch modules 20 (S1, S2, S7, S8) and charges the snubber capacitors 22 for the third, fourth, fifth, and sixth switch modules 20 (S3, S4, S5, S6).

Once the snubber charge transfer is complete, the resonant current begins to flow through the freewheeling diodes 26 of the first, second, seventh, and eight switch modules 20 (S1, S2, S7, S8), transitioning to the fourth operating state. As shown in FIG. 5, the current flows from the negative rail 16 of the DC bus through the freewheeling diodes 26 of the seventh and eighth switch modules S7, S8 of the second switching arm 13 and to the first switching arm 11 via the load across the output voltage terminals 18. The current continues to flow thorough the freewheeling diodes 26 of the first and second switch modules S1, S2 of the first switching arm 11 to the positive rail 14. The voltage potential across the third, fourth, fifth, and sixth switch modules 20 (S3, S4, S5, S6) is one-half the voltage potential present on the DC bus 12 and the voltage potential across the first, second, seventh, and eighth switch modules 20 (S1, S2, S7, S8) is zero. Consequently, the voltage potential on the DC bus 12 is again distributed across two of the switch modules 20 in each arm 11, 13 and one-half of the voltage potential on the DC bus 12 is present across the flying capacitor 38 of each switching arm 11, 13. During the fourth operating state, the processor 48 sets the gating signals 25 for the first and second switch modules 20 (S1, S2) and for the seventh and eighth switch modules 20 (S7, S8), returning to the first operating state. The four operating states are repeated during the first operating mode to generate a desired output voltage at the output voltage terminals 18.

Figure 6:
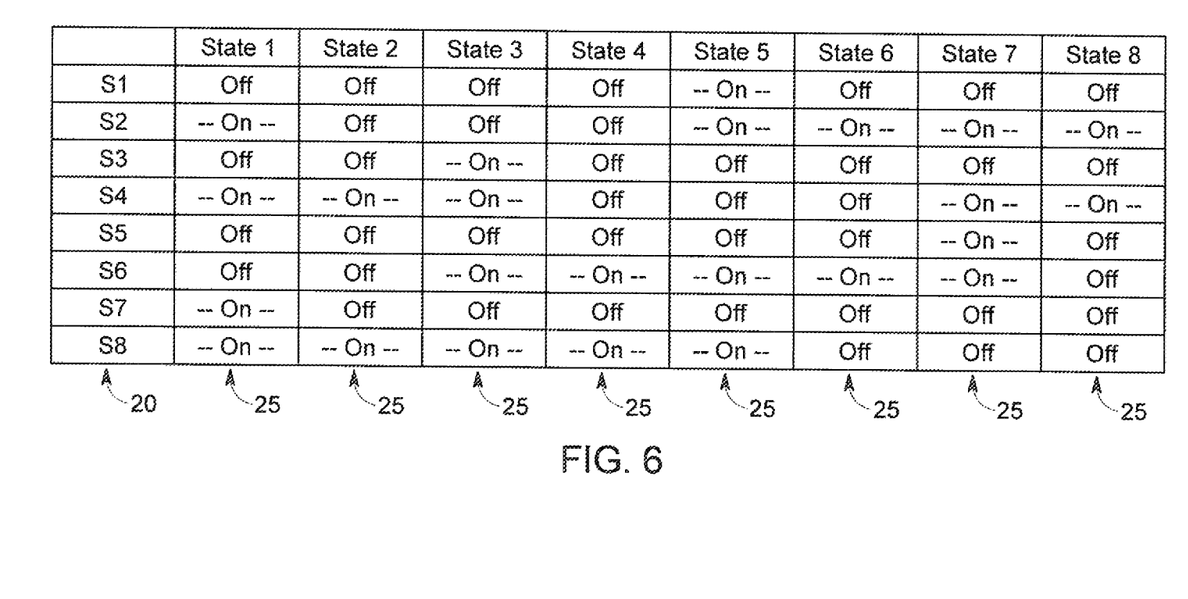
FIG. 6 is a graphical representation of the sequence of gating signals for controlling the power converter of FIG. 1 in a second operating mode.
Figure 7:
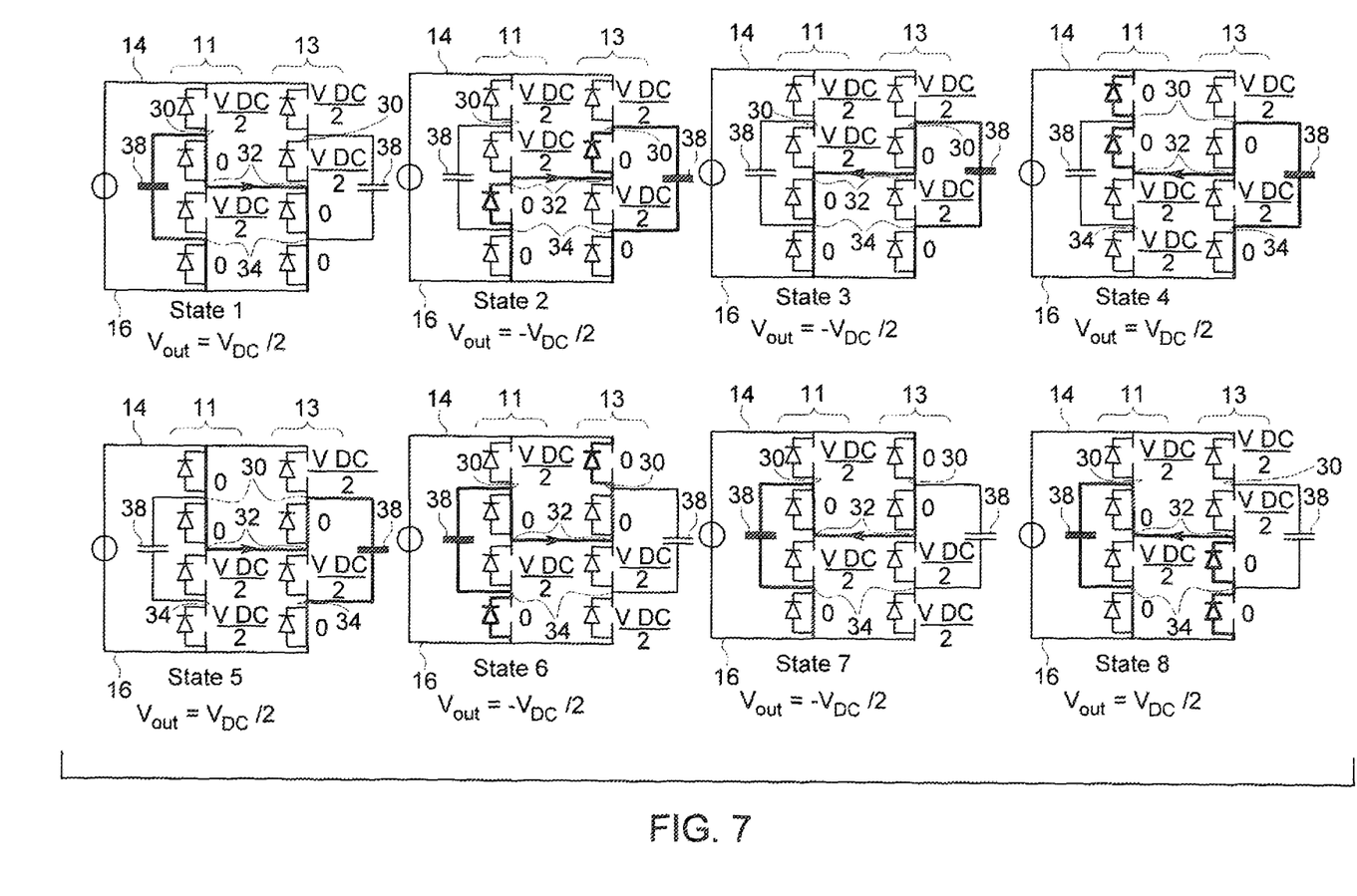
FIG. 7 is a schematic representation of the sequence of operating states for the power converter of FIG. 1 in the second operating mode.

With reference next to FIGS. 6 and 7, the processor 48 is operable to execute a second control method. The second control method is configured for a second operating mode, where the second operating mode may include operation between about 12.5% and about 50% of rated power and, more preferably, includes operation at about 25% of rated power. The switch modules 20 are controlled to provide plus or minus one half of the voltage potential present on the DC bus 12 (i.e., +/−VDC/2) at the output voltage terminals 18. The processor 48 generates eight sets of gating signals 25, resulting in eight states of operation.

In the first operating state for the second operating mode, the processor sets gating signals 25 for, or enables, the second, fourth, seventh, and eighth switch modules 20 (S2, S4, S7, S8). The gating signals 25 for the first, third, fifth, and sixth switch modules 20 (S1, S3, S5, S6) remain off. As shown in FIG. 7, the current flows from the negative rail 16 of the DC bus 12 through the fourth switch module S4 to the third intermediate connection 34 and then through the flying capacitor 38 to the first intermediate connection 30 of the first switching arm 11. The current is then conducted through the second switch module S2 and to the second switching arm 13 via the load across the output voltage terminals 18. The current continues to flow thorough the second switching arm 13 back to the negative rail 16 via the seventh and eighth switch modules S7, S8. The voltage potential on each of the switch modules 20 for which the gating signals 25 are set is zero, and the voltage potential on each of the switch modules 20 for which the gating signals 25 are off is one-half the voltage potential present on the DC bus 12. Consequently, the voltage potential on the DC bus 12 is distributed across two of the switch modules 20 in each arm 11, 13. The voltage potential seen across the output voltage terminals 18 is one half of the voltage potential present on the DC bus 12.

The power converter 10 remains in the first operating state for a desired conduction time. During this conduction time the snubber capacitors 22 for the first, third, fifth, and sixth switch modules 20 (S1, S3, S5, S6) are charged to one half the DC bus voltage potential. At the completion of the desired conduction time, the processor 48 turns off the gating signal 25 for the second and seventh switch modules S2, S7. The gating signals 25 for the fourth and eighth switch modules S4, S8 remain set. The resonant current causes the snubber capacitors 22 for the second and seventh switch modules S2, S7, which were just turned off, to become charged and the snubber capacitors 22 for the third and sixth switch modules S3, S6 to become discharged.

Once the snubber charge transfer is complete, the resonant current begins to flow through the freewheeling diodes 26 of the third and sixth switch modules S3, S6 and the power converter 10 transitions to the second operating state of the second operating mode. As shown in FIG. 7, the current flows from the negative rail 16 of the DC bus 12 through the fourth switch module S4 to the third intermediate connection 34 and then through the freewheeling diode 26 of the third switch module S3 to the second intermediate connection point 32. The current is then conducted to the second switching arm 13 via the load across the output voltage terminals 18. In the second switching arm 13, the current is conducted through the freewheeling diode 26 of the sixth switch module S6, the flying capacitor 38 and the eighth switch module S8 back to the negative rail 16 of the DC bus 12. The voltage potential seen across the output voltage terminals 18 is negative one half of the voltage potential present on the DC bus 12. During the second operating state, the processor 48 sets the gating signals 25 for the third and sixth switch modules S3, S6, transitioning to the third operating state.

In the third operating state for the second operating mode, the gating signals 25 for the third, fourth, sixth, and eighth switch modules 20 (S3, S4, S6, S8) are set. The gating signals 25 for the first, second, fifth, and seventh switch modules 20 (S1, S2, S5, S7) remain off. As shown in FIG. 7, the current flows from the negative rail 16 of the DC bus through the eighth switch module S8 to the third intermediate connection 34 and then through the flying capacitor 38 to the first intermediate connection 30 of the second switching arm 13. The current is then conducted through the sixth switch module S2 and to the first switching arm 11 via the load across the output voltage terminals 18. The current continues to flow thorough the first switching arm 11 back to the negative rail 16 via the third and fourth switch modules S3, S4. The voltage potential on each of the switch modules 20 for which the gating signals 25 are set is zero, and the voltage potential on each of the switch modules 20 for which the gating signals 25 are off is one-half the voltage potential present on the DC bus 12. Consequently, the voltage potential on the DC bus 12 is distributed across two of the switch modules 20 in each arm 11, 13. The voltage potential seen across the output voltage terminals 18 is negative one half of the voltage potential present on the DC bus 12.

The power converter 10 remains in the third operating state for a desired conduction time. During this conduction time the snubber capacitors 22 for the first, second, fifth, and seventh switch modules 20 (S1, S2, S5, S7) are charged to one half the DC bus voltage potential. At the completion of the desired conduction time, the processor 48 turns off the gating signal 25 for the third and fourth switch modules S3, S4. The gating signals 25 for the sixth and eighth switch modules S6, S8 remain set. The resonant current causes the snubber capacitors 22 for the third and fourth switch modules S3, S4, which were just turned off, to become charged and the snubber capacitors 22 for the first and second switch modules S1, S2 to become discharged.

Once the snubber charge transfer is complete, the resonant current begins to flow through the freewheeling diodes 26 of the first and second switch modules S1, S2 and the power converter 10 transitions to the fourth operating state of the second operating mode. As shown in FIG. 7, the current flows from the negative rail 16 of the DC bus 12 through the eighth switch module S8 to the third intermediate connection 34 and then through the flying capacitor 38 of the second switching arm 13 to the first intermediate connection point 30. The current is then conducted through the sixth switch module S6 and to the first switching arm 11 via the load across the output voltage terminals 18. The current continues to flow thorough the first switching arm 11 to the positive rail 14 via the freewheeling diodes 26 of the first and second switch modules S1, S2. The voltage potential seen across the output voltage terminals 18 is one half of the voltage potential present on the DC bus 12. During the fourth operating state, the processor 48 sets the gating signals 25 for the first and second switch modules S1, S2, transitioning to the fifth operating state.

In the fifth operating state for the second operating mode, the gating signals 25 for the first, second, sixth, and eighth switch modules 20 (S1, S2, S6, S8) are set. The gating signals 25 for the third, fourth, fifth, and seventh switch modules 20 (S3, S4, S5, S7) remain off. As shown in FIG. 7, the current flows from the positive rail 14 of the DC bus 12 through the first and second switch modules S1, S2 to the second intermediate connection 32 in the first switching arm 11 and then to the second switching arm 13 via the load across the output voltage terminals 18. The current continues to flow thorough the second switching arm 13 back to the negative rail 16 via the sixth switch module S6, the flying capacitor 38 to the third intermediate connection 34, and the eighth switch module S8. The voltage potential on each of the switch modules 20 for which the gating signals 25 are set is zero, and the voltage potential on each of the switch modules 20 for which the gating signals 25 are off is one-half the voltage potential present on the DC bus 12. Consequently, the voltage potential on the DC bus 12 is distributed across two of the switch modules 20 in each arm 11, 13. The voltage potential seen across the output voltage terminals 18 is one half of the voltage potential present on the DC bus 12.

The power converter 10 remains in the fifth operating state for a desired conduction time. During this conduction time the snubber capacitors 22 for the third, fourth, fifth, and seventh switch modules 20 (S3, S4, S5, S7) are charged to one half the DC bus voltage potential. At the completion of the desired conduction time, the processor 48 turns off the gating signal 25 for the first and eighth switch modules S1, S8. The gating signals 25 for the second and sixth switch modules S2, S6 remain set. The resonant current causes the snubber capacitors 22 for the first and eighth switch modules S1, S8, which were just turned off, to become charged and the snubber capacitors 22 for the fourth and fifth switch modules S4, S5 to become discharged.

Once the snubber charge transfer is complete, the resonant current begins to flow through the freewheeling diodes 26 of the fourth and fifth switch modules S4, S5 and the power converter 10 transitions to the sixth operating state of the second operating mode. As shown in FIG. 7, the current flows from the negative rail 16 of the DC bus 12 through the freewheeling diode 26 of the fourth switch module S4 to the third intermediate connection 34 and then through the flying capacitor 38 to the first intermediate connection point 30 of the first switching arm 11. The current is then conducted through the second switch module S2 and to the second switching arm 13 via the load across the output voltage terminals 18. In the second switching arm 13, the current is conducted through the sixth switch module S6 and the freewheeling diode 26 of the fifth switch module S5 to the positive rail 14 of the DC bus 12. The voltage potential seen across the output voltage terminals 18 is negative one half of the voltage potential present on the DC bus 12. During the sixth operating state, the processor 48 sets the gating signals 25 for the fourth and fifth switch modules S4, S5, transitioning to the seventh operating state.

In the seventh operating state for the second operating mode, the gating signals 25 for the second, fourth, fifth, and sixth switch modules 20 (S2, S4, S5, S6) are set. The gating signals 25 for the first, third, seventh, and eighth switch modules 20 (S1, S3, S7, S8) remain off. As shown in FIG. 7, the current flows from the positive rail 14 of the DC bus 12 through the fifth and sixth switch modules S5, S6 to the second intermediate connection 32 in the second switching arm 13 and then to the first switching arm 11 via the load across the output voltage terminals 18. The current continues to flow thorough the first switching arm 11 to the negative rail 16 via the second switch module S2, the flying capacitor 38 to the third intermediate connection 34, and the fourth switch module S4. The voltage potential on each of the switch modules 20 for which the gating signals 25 are set is zero, and the voltage potential on each of the switch modules 20 for which the gating signals 25 are off is one-half the voltage potential present on the DC bus 12. Consequently, the voltage potential on the DC bus 12 is distributed across two of the switch modules 20 in each arm 11, 13. The voltage potential seen across the output voltage terminals 18 is negative one half of the voltage potential present on the DC bus 12.

The power converter 10 remains in the seventh operating state for a desired conduction time. During this conduction time the snubber capacitors 22 for the first, third, seventh, and eighth switch modules 20 (S1, S3, S7, S8) are charged to one half the DC bus voltage potential. At the completion of the desired conduction time, the processor 48 turns off the gating signal 25 for the fifth and sixth switch modules S5, S6. The gating signals 25 for the second and fourth switch modules S2, S4 remain set. The resonant current causes the snubber capacitors 22 for the fifth and sixth switch modules S5, S6, which were just turned off, to become charged and the snubber capacitors 22 for the seventh and eighth switch modules S7, S8 to become discharged.

Once the snubber charge transfer is complete, the resonant current begins to flow through the freewheeling diodes 26 of the seventh and eighth switch modules S7, S8 and the power converter 10 transitions to the eighth operating state of the second operating mode. As shown in FIG. 7, the current flows from the negative rail 16 of the DC bus 12 through the freewheeling diodes 26 of the seventh and eighth switch modules S7, S8 to the second intermediate connection 32 of the second switching arm 13 and then to the first switching arm 11 via the load across the output voltage terminals 18. In the first switching arm 11, the current is conducted back to the negative rail 16 via the second switch module S2, the flying capacitor 38 to the third intermediate connection point 34, and the fourth switch module S4. The voltage potential seen across the output voltage terminals 18 is one half of the voltage potential present on the DC bus 12. During the eighth operating state, the processor 48 sets the gating signals 25 for the seventh and eighth switch modules S7, S8, such that the second operating mode returns to its first operating state. These eight operating states are repeated during the second operating mode to generate a desired output voltage at the output voltage terminals 18.

Figure 8:
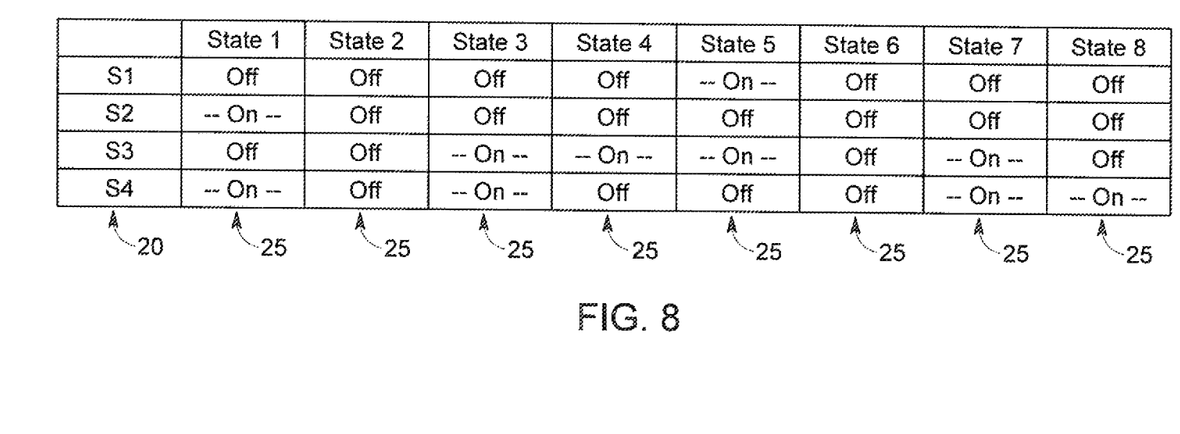
FIG. 8 is a graphical representation of the sequence of gating signals for controlling the power converter of FIG. 1 in a third operating mode.
Figure 9:
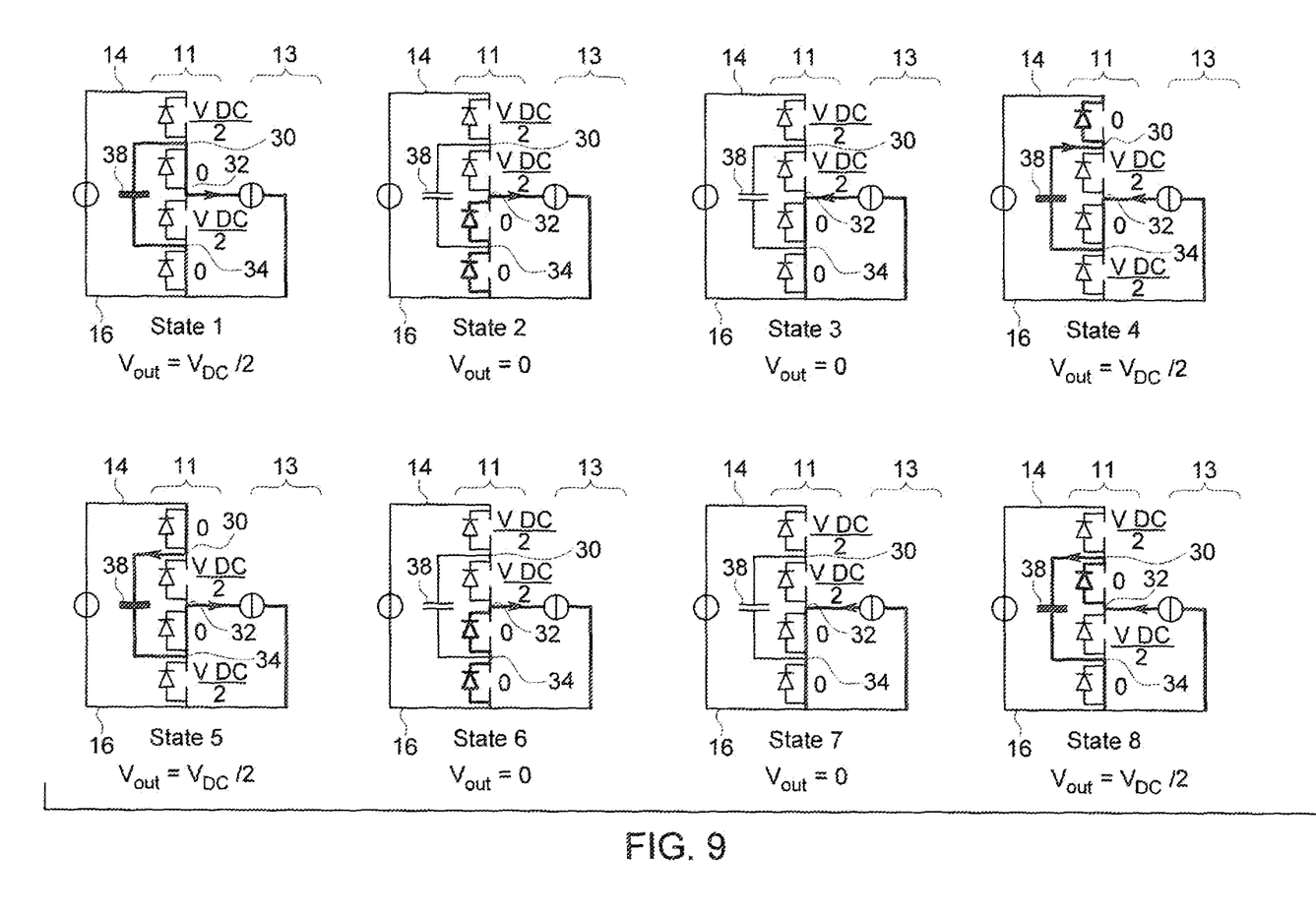
FIG. 9 is a schematic representation of the sequence of operating states for the power converter of FIG. 1 in the third operating mode.

With reference next to FIGS. 8 and 9, the processor 48 is operable to execute a third control method. The third control method is configured for a third operating mode, where the third operating mode may include low power operation less than about 12.5% of rated power and, more preferably, at about 6.125% of rated power. The switch modules 20 are controlled to provide either one half of the voltage potential present on the DC bus 12 or zero volts at the output voltage terminals 18. The processor 48 generates eight sets of gating signals 25, resulting in eight states of operation. As further seen in FIG. 9, the third operating mode is configured to execute utilizing only one of the two switching arms 11, 13. According to the illustrated states, operation with respect to the first switching arm 11 will be discussed. It is understood that similar operation may be achieved utilizing the second switching arm 13 and generating gating signals 25 for the corresponding switch modules 20 in the second switching arm 13. It is further contemplated that the first and second switching arms 11, 13 may be alternately utilized during the third control operating mode to balance losses and utilization of the two switching arms 11, 13.

In the first operating state for the third operating mode, the processor sets gating signals 25 for, or enables, the second and fourth switch modules 20 (S2, S4). The gating signals 25 for the first and third switch modules 20 (S1, S3) remain off. As shown in FIG. 9, the current flows from the negative rail 16 of the DC bus 12 through the fourth switch module S4, through the flying capacitor 38 to the first intermediate connection 30, and then through the second switch module S2 to the output terminal 18 on the first switching arm 11. The current is then conducted through the load and back to the negative rail 16 of the DC bus 12. The conduction path may be established, for example, by setting gating signals 25 for the seventh and eighth switch modules S7, S8 on. The gating signals 25 for the seventh and eighth switch modules S7, S8 remain on throughout the third operating mode when the second switching arm 13 is providing the return conduction path to the negative rail 16. The voltage potential on each of the switch modules 20 in the first switching arm 11 for which the gating signals 25 are set is zero, and the voltage potential on each of the switch modules 20 in the first switching arm 11 for which the gating signals 25 are off is one-half the voltage potential present on the DC bus 12. Consequently, the voltage potential on the DC bus 12 is distributed across two of the switch modules 20 in the first switching arm 11. The voltage potential seen across the output voltage terminals 18 is one half of the voltage potential present on the DC bus 12.

The power converter 10 remains in the first operating state of the third operating mode for a desired conduction time. During this conduction time the snubber capacitors 22 for the first and third switch modules 20 (S1, S3) are charged to one half the DC bus voltage potential. At the completion of the desired conduction time, the processor 48 turns off the gating signals 25 for the second and fourth switch modules S2, S4. The resonant current causes the snubber capacitor 22 for the second switch module S2, which was just turned off, to become charged and the snubber capacitor 22 for the third switch module S3 to become discharged.

Once the snubber charge transfer is complete, the resonant current begins to flow through the freewheeling diodes 26 of the third and fourth switch modules S3, S4 and the power converter 10 transitions to the second operating state of the third operating mode. As shown in FIG. 9, the current flows from the negative rail 16 of the DC bus 12 through the freewheeling diodes 26 of the third and fourth switch modules S3, S4 to the output voltage terminal 18 on the first switching arm 11. The return conduction path through the seventh and eighth switch modules S7, S8 on the second switching arm 13 is maintained, and the voltage potential seen across the output voltage terminals 18 is zero. During the second operating state, the processor 48 sets the gating signals 25 for the third and fourth switch modules S3, S4, transitioning to the third operating state.

In the third operating state for the third operating mode, the gating signals 25 for the third and fourth switch modules S3, S4 are set. The gating signals 25 for the first and second switch modules S1, S2 remain off. As shown in FIG. 9, the current flows from the negative rail 16 of the DC bus 12 through the conduction path in the second switching arm 13, through the load to the first switching arm 11, and returns to the negative rail 16 via the third and fourth switch modules S3, S4. The voltage potential on each of the switch modules 20 in the first switching arm 11 for which the gating signals 25 are set is zero, and the voltage potential on each of the switch modules 20 in the first switching arm 11 for which the gating signals 25 are off is one-half the voltage potential present on the DC bus 12. Consequently, the voltage potential on the DC bus 12 is distributed across two of the switch modules 20 in the first switching arm 11 and the voltage potential seen across the output voltage terminals 18 is zero.

The power converter 10 remains in the third operating state of the third operating mode for a desired conduction time. During this conduction time the snubber capacitors 22 for the first and second switch modules S1, S2 are charged to one half the DC bus voltage potential. At the completion of the desired conduction time, the processor 48 turns off the gating signal 25 for the fourth switch module S4, and the gating signal 25 for the third switch module S3 remains on. The resonant current causes the snubber capacitor 22 for the fourth switch module S4, which was just turned off, to become charged and the snubber capacitor 22 for the first switch module S1 to become discharged.

Once the snubber charge transfer is complete, the resonant current begins to flow through the freewheeling diode 26 of the first switch module S1 and the power converter 10 transitions to the fourth operating state of the third operating mode. As shown in FIG. 9, the current flows from the negative rail 16 of the DC bus 12 through the conduction path of the second switching arm 13 and through the load to the first switching arm 11. In the first switching arm 11, the current flows to the positive rail 14 via the third switch module S3, the flying capacitor 38, and the freewheeling diode 26 of the first switch module S1. The voltage potential seen across the output voltage terminals 18 is one half of the voltage potential present on the DC bus 12. During the fourth operating state, the processor 48 sets the gating signal 25 for the first switch module S1, transitioning to the fifth operating state.

In the fifth operating state for the third operating mode, the gating signals 25 for the first and third switch modules S1, S3 are set. The gating signals 25 for the second and fourth switch modules S2, S4 remain off. As shown in FIG. 9, the current flows from the positive rail 14 of the DC bus 12 through the first switch module S1, through the flying capacitor 38 to the third intermediate connection 34, and then through the third switch module S3 to the output terminal 18 on the first switching arm 11. The current is then conducted through the load and to the negative rail 16 via the conduction path in the second switching arm 13. The voltage potential on each of the switch modules 20 in the first switching arm 11 for which the gating signals 25 are set is zero, and the voltage potential on each of the switch modules 20 in the first switching arm 11 for which the gating signals 25 are off is one-half the voltage potential present on the DC bus 12. Consequently, the voltage potential on the DC bus 12 is distributed across two of the switch modules 20 in the first switching arm 11. The voltage potential seen across the output voltage terminals 18 is one half of the voltage potential present on the DC bus 12.

The power converter 10 remains in the fifth operating state of the third operating mode for a desired conduction time. During this conduction time the snubber capacitors 22 for the second and fourth switch modules S2, S4 are charged to one half the DC bus voltage potential. At the completion of the desired conduction time, the processor 48 turns off the gating signals 25 for the first and third switch modules S1, S3. The resonant current causes the snubber capacitor 22 for the first switch module S1, which was just turned off, to become charged and the snubber capacitor 22 for the fourth switch module S4 to become discharged.

Once the snubber charge transfer is complete, the resonant current begins to flow through the freewheeling diodes 26 of the third and fourth switch modules S3, S4 and the power converter 10 transitions to the sixth operating state of the third operating mode. As shown in FIG. 9, the current flows from the negative rail 16 of the DC bus 12 through the freewheeling diodes 26 of the third and fourth switch modules S3, S4 to the output voltage terminal 18 on the first switching arm 11. The return conduction path through the seventh and eighth switch modules S7, S8 on the second switching arm 13 is maintained, and the voltage potential seen across the output voltage terminals 18 is zero. During the sixth operating state, the processor 48 sets the gating signals 25 for the third and fourth switch modules S3, S4, transitioning to the seventh operating state.

In the seventh operating state for the third operating mode, the gating signals 25 for the third and fourth switch modules S3, S4 are set. The gating signals 25 for the first and second switch modules S1, S2 remain off. As shown in FIG. 9, the current flows from the negative rail 16 of the DC bus 12 through the conduction path in the second switching arm 13, through the load to the first switching arm 11, and returns to the negative rail 16 via the third and fourth switch modules S3, S4. The voltage potential on each of the switch modules 20 in the first switching arm 11 for which the gating signals 25 are set is zero, and the voltage potential on each of the switch modules 20 in the first switching arm 11 for which the gating signals 25 are off is one-half the voltage potential present on the DC bus 12. Consequently, the voltage potential on the DC bus 12 is distributed across two of the switch modules 20 in the first switching arm 11. The voltage potential seen across the output voltage terminals 18 is zero.

The power converter 10 remains in the seventh operating state of the third operating mode for a desired conduction time. During this conduction time the snubber capacitors 22 for the first and second switch modules S1, S2 are charged to one half the DC bus voltage potential. At the completion of the desired conduction time, the processor 48 turns off the gating signal 25 for the third switch module S3, and the gating signal 25 for the fourth switch module S4 remains on. The resonant current causes the snubber capacitor 22 for the third switch module S3, which was just turned off, to become charged and the snubber capacitor 22 for the second switch module S2 to become discharged.

Once the snubber charge transfer is complete, the resonant current begins to flow through the freewheeling diode 26 of the second switch module S2 and the power converter 10 transitions to the eighth operating state of the third operating mode. As shown in FIG. 9, the current flows from the negative rail 16 of the DC bus 12 through the conduction path of the second switching arm 13 and through the load to the first switching arm 11. In the first switching arm 11, the current returns to the negative rail 16 via the freewheeling diode 26 of the second switch module S2, the flying capacitor 38, and the fourth switch module S4. The voltage potential seen across the output voltage terminals 18 is one half of the voltage potential present on the DC bus 12. During the eighth operating state, the processor 48 sets the gating signal 25 for the second switch module S2, returning to the first operating state. These eight operating states are repeated during the third operating mode to generate a desired output voltage at the output voltage terminals 18.

Figure 10:
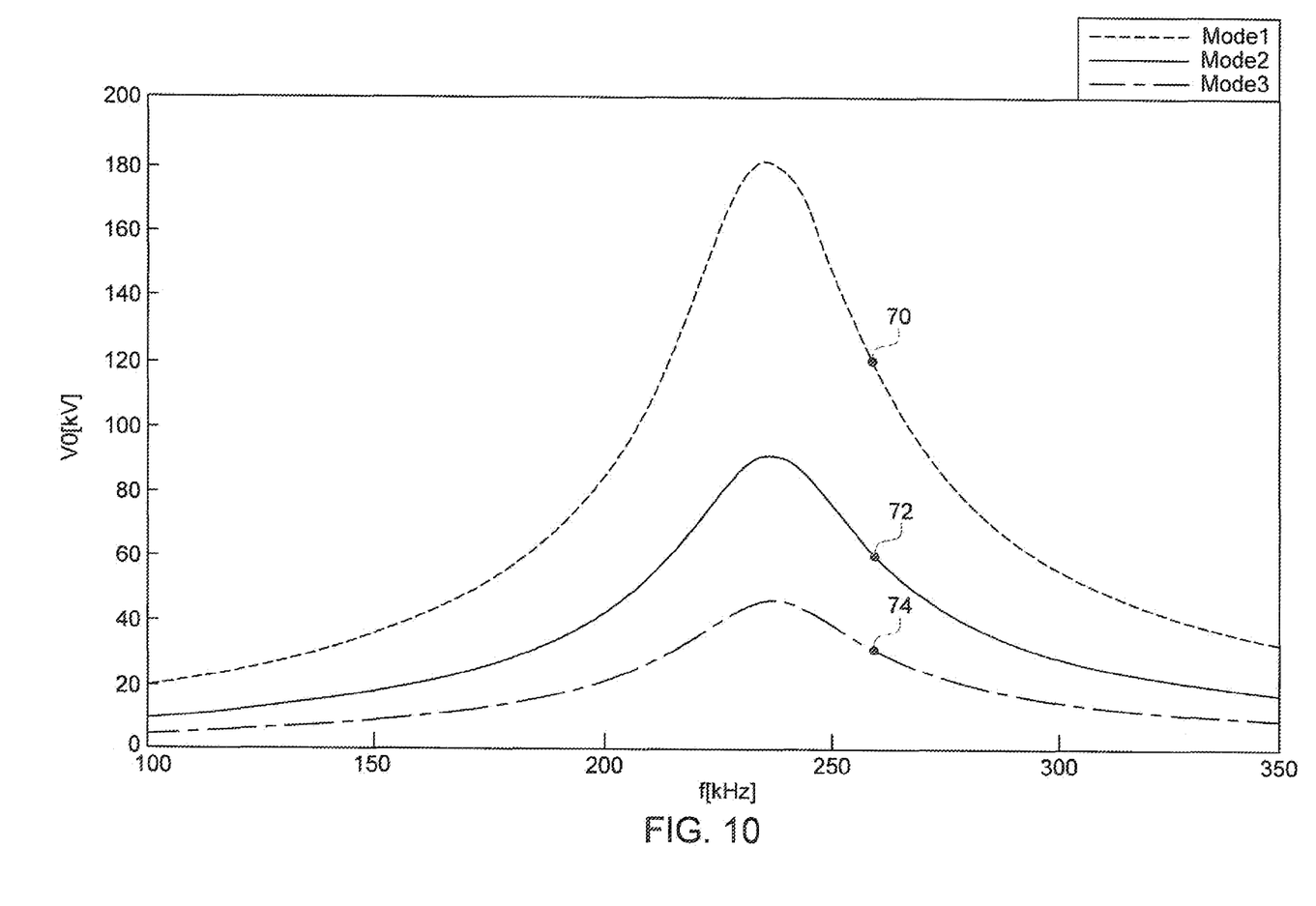
FIG. 10 is a graphical representation of the output voltage delivered by the multilevel soft switching power converter for varying switching frequencies in each of the three modes of operation according to one embodiment of the invention.

Referring next to FIG. 10, operation of the above-described power converter is graphically illustrated for an exemplary application. The exemplary application is a power converter operable to provide a single phase or a multiphase output voltage to the primary side of a high voltage transformer for an X-ray generator. The X-ray generator is configured for three operating modes. During the first, high power, operating mode, the X-ray generator is configured to output a voltage at about 120 kV. During the second, medium power, operating mode, the X-ray generator is configure to output a voltage at about 60 kV. During the third, low power, operating mode, the X-ray generator generates about 30 kV. Operation of the power converter for the X-ray generator in the first operating mode, utilizes the first switching technique discussed above. Operation of the power converter for the X-ray generator in the second operating mode, utilizes the second switching technique discussed above. Operation of the power converter for the X-ray generator in the third operating mode, utilizes the third switching technique discussed above.

According to the illustrated example, the power converter is able to generate the desired output voltage during the first operating mode at about 260 kHz switching frequency, as identified by the point labeled by reference numeral 70. If, however, the X-ray generator attempted to operate at the desired low power setting utilizing the first operating mode, the curve extends off the plot to the right to reach 30 kV, requiring a switching frequency in excess of 350 kHz, which is beyond the range of the switching devices. Operation of the power converter in the third operating mode, however, results in the desired output voltage again being generated at about 260 kHz, as identified by the point labeled by reference numeral 74. Similarly, operation of the power converter in the second operating mode results in the desired output voltage again being generated at about 260 kHz, as identified by the point labeled by reference numeral 72. Each of these operating points is above the resonant point, identified by the peak of each curve, to ensure soft switching operation of the power converter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A multilevel soft switching power converter, comprising:
   a direct current (DC) bus having a positive rail and a negative rail operable to have a voltage potential present across the DC bus;
   a pair of switching arms, each switching arm connected between the positive rail and the negative rail, each switching arm further comprising:
      a first soft switch connected between the positive rail and a first intermediate connection and controlled by a first gating signal,
      a second soft switch connected between the first intermediate connection and a second intermediate connection and controlled by a second gating signal,
      a third soft switch connected between the second intermediate connection and a third intermediate connection and controlled by a third gating signal,
      a fourth soft switch connected between the third intermediate connection and the negative rail and controlled by a fourth gating signal,
      a flying capacitor connected between the first intermediate connection and the third intermediate connection, and
      an output terminal connected at the second intermediate connection; and
   a controller operable to:
   control each of the first soft switch, the second soft switch, the third soft switch, and the fourth soft switch in at least a first operating mode, a second operating mode, and a third operating mode,
   receive a command signal corresponding to a desired operation of the multilevel soft switching power converter,
   receive at least one first feedback signal corresponding to one of a current and a voltage present at an input to the multilevel soft switching power converter,
   receive at least one second feedback signal corresponding to one of a current and a voltage present at an output of the multilevel soft switching power converter,
   generate each of the first gating signal, the second gating signal, the third gating signal, and the fourth gating signal responsive to the command signal, the first feedback signal, and the second feedback signal, and
   generate the first gating signal, the second gating signal, the third gating signal, and the fourth gating signal in a first sequence in the first operating mode, a second sequence in the second operating mode, and a third sequence in the third operating mode.

2. The multilevel soft switching power converter of claim 1 wherein:
   the first soft switch includes a first solid state switch, a first freewheeling diode, and a first snubbing capacitor;
   the second soft switch includes a second solid state switch, a second freewheeling diode, and a second snubbing capacitor;
   the third soft switch includes a third solid state switch, a third freewheeling diode, and a third snubbing capacitor; and
   the fourth soft switch includes a fourth solid state switch, a fourth freewheeling diode, and a fourth snubbing capacitor.

3. The multilevel soft switching power converter of claim 2 further comprising:
   a first resistor connected in parallel to the first soft switch;
   a second resistor connected in parallel to the second soft switch;
   a third resistor connected in parallel to the third soft switch; and
   a fourth resistor connected in parallel to the fourth soft switch.

4. The multilevel soft switching power converter of claim 1 wherein a voltage potential across the flying capacitor of each switching arm is about one half the voltage potential present across the DC bus during each of the three operating modes.

5. The multilevel soft switching power converter of claim 4 wherein a voltage potential across two of the soft switches in each switching arm is about one half the voltage potential present across the DC bus during each of the three operating modes.

6. The multilevel soft switching power converter of claim 1 wherein during a first operating mode the first soft switch and the second soft switch on one of the switching arms from the pair of switching arms are switched in tandem and the third soft switch and the fourth soft switch on one of the switching arms from the pair of switching arms are switched in tandem.

7. The multilevel soft switching power converter of claim 6 wherein during a second operating mode:
   the first soft switch, the second soft switch, the third soft switch, and the fourth soft switch are controlled to alternately connect one of a first voltage potential and a second voltage potential across the output terminals of the pair of switching arms,
   the first voltage potential is a positive one half times the voltage potential present across the DC bus; and the second voltage potential is a negative one half times the voltage potential present across the DC bus.

8. The multilevel soft switching power converter of claim 7 wherein during a third operating mode:
the first soft switch, the second soft switch, the third soft switch, and the fourth soft switch are controlled to alternately connect one of the first voltage potential and zero volts across the output terminals of the pair of switching arms.

9. A method of controlling a multilevel soft switching power converter, wherein the multilevel soft switching power converter includes a pair of switching arms, each switching arm connected between a positive rail and a negative rail of a direct current (DC) bus and each switching arm comprising four soft switches, connected in series between the positive rail and the negative rail, and a flying capacitor, the method comprising the steps of:
receiving a command signal at a controller, wherein the command signal corresponds to a desired operation of the multilevel soft switching power converter and wherein the multilevel soft switching power converter is operable to control the soft switches in at least a first operating mode, a second operating mode, and a third operating mode;
receiving at the controller at least one first feedback signal corresponding to one of a current and a voltage present at an input to the power converter;
receiving at the controller at least one second feedback signal corresponding to one of a current and a voltage present at an output of the power converter; and
generating a plurality of gating signals with the controller, wherein:
each gating signal is generated responsive to the command signal, the first feedback signal, and the second feedback signal,
each gating signal corresponds to one of the soft switches, and
the gating signals are generated in a first sequence in the first operating mode, a second sequence in the second operating mode, and a third sequence in the third operating mode.

10. The method of claim 9 wherein:
a first soft switch from the four soft switches includes a first solid state switch, a first freewheeling diode, and a first snubbing capacitor;
a second soft switch from the four soft switches includes a second solid state switch, a second freewheeling diode, and a second snubbing capacitor;
a third soft switch from the four soft switches includes a third solid state switch, a third freewheeling diode, and a third snubbing capacitor; and
a fourth soft switch from the four soft switches includes a fourth solid state switch, a fourth freewheeling diode, and a fourth snubbing capacitor.

11. The method of claim 10 further comprising the steps of:
providing a first resistor connected in parallel to the first soft switch;
providing a second resistor connected in parallel to the second soft switch;
providing a third resistor connected in parallel to the third soft switch; and
providing a fourth resistor connected in parallel to the fourth soft switch.

12. The method of claim 10 wherein during the first operating mode, the gating signals for the first soft switch and the second soft switch on one of the switching arms from the pair of switching arms are switched in tandem and the third soft switch and the fourth soft switch on one of the switching arms from the pair of switching arms are switched in tandem.

13. The method of claim 12 wherein during the first operating mode, the gating signals are generated according to the following steps:
setting the gating signal for the first soft switch and the second soft switch for a first switching arm selected from the pair of switching arms in tandem with the third soft switch and the fourth soft switch of a second switching arm selected from the pair of switching arms;
resetting the gating signal for all of the soft switches;
setting the gating signal for the first soft switch and the second soft switch for the second switching arm in tandem with the third soft switch and the fourth soft switch of the second switching arm; and
resetting the gating signal for all of the soft switches.

14. The method of claim 12 wherein, during the second operating mode:
the first soft switch, the second soft switch, the third soft switch, and the fourth soft switch are controlled to alternately connect one of a first voltage potential and a second voltage potential across the output terminals of the pair of switching arms,
the first voltage potential is a positive one half times the voltage potential present across the DC bus; and
the second voltage potential is a negative one half times the voltage potential present across the DC bus.

15. The method of claim 14 wherein during the second operating mode, the gating signals are generated according to the following steps:
setting the gating signal for the second and fourth soft switch in the first switching arm and for the third and fourth soft switch in the second switching arm in tandem;
resetting the gating signal for the second soft switch in the first switching arm and for the third soft switch in the second switching arm in tandem;
setting the gating signal for the third soft switch in the first switching arm and for the second soft switch in the second switching arm in tandem;
resetting the gating signal for the third and fourth soft switch in the first switching arm in tandem;
setting the gating signal for the first and second soft switch in the first switching arm in tandem;
resetting the gating signal for the first soft switch in the first switching arm and for the fourth soft switch in the second switching arm in tandem;
setting the gating signal for the fourth soft switch in the first switching arm and for the first soft switch in the second switching arm in tandem; and
resetting the gating signal for the first and second soft switch in the second switching arm in tandem.

16. The method of claim 14 wherein, during the third operating mode:
the first soft switch, the second soft switch, the third soft switch, and the fourth soft switch are controlled to alternately connect one of the first voltage potential and zero volts across the output terminals of the pair of switching arms.

17. The method of claim 16 wherein during the third operating mode, the gating signals are generated according to the following steps:
setting the gating signal for the second and fourth soft switch in the first switching arm in tandem;

resetting the gating signal for the second and fourth soft switches in the first switching arm in tandem;
setting the gating signal for the third and fourth soft switches in the first switching arm in tandem;
resetting the gating signal for the fourth soft switch in the first switching arm;
setting the gating signal for the first soft switch in the first switching arm;
resetting the gating signal for the first and third soft switch in the first switching arm in tandem;
setting the gating signal for the third and fourth soft switch in the first switching arm in tandem; and
resetting the gating signal for the third soft switch in the first switching arm.

* * * * *